US00RE37692E

(19) United States
(12) Reissued Patent
Rashleigh et al.

(10) Patent Number: US RE37,692 E
(45) Date of Reissued Patent: May 7, 2002

(54) PACKAGING FIBER OPTIC COMPONENTS

(75) Inventors: Scott C. Rashleigh, Red Hill; Robert Brunswick, Wamboin; Martin C. Elias, O'Connor, all of (AU)

(73) Assignee: AOFR Pty. Limited (AU)

(21) Appl. No.: 09/241,709

(22) PCT Filed: Aug. 13, 1992

(86) PCT No.: PCT/AU92/00425

§ 371 Date: Jun. 30, 1994

§ 102(e) Date: Jun. 30, 1994

(87) PCT Pub. No.: WO93/04389

PCT Pub. Date: Mar. 4, 1993

Related U.S. Patent Documents

Reissue of:
(64) Patent No.: 5,602,952
Issued: Feb. 11, 1997
Appl. No.: 08/193,187
Filed: Jun. 30, 1994

(30) Foreign Application Priority Data

Aug. 16, 1991 (AU) ..... 7797/91

(51) Int. Cl.[7] ..... G02B 6/44
(52) U.S. Cl. ..... 385/100
(58) Field of Search ..... 385/100

(56) References Cited

U.S. PATENT DOCUMENTS 4,767,173 A * 8/1988 Priaroggia ..... 385/100
4,844,575 A * 7/1989 Kinard et al. ..... 385/100
5,071,221 A * 12/1991 Fujitani et al. ..... 385/100

FOREIGN PATENT DOCUMENTS

| | | | |
|---|---|---|---|
| EP | 02-06226 | * 12/1986 | 385/100 |
| EP | 02-86349 | * 10/1988 | 385/100 |
| EP | 03-53775 | * 2/1990 | 385/100 |
| EP | 04-30533 | * 6/1991 | 385/100 |
| GB | 21-64469 | * 3/1986 | 385/100 |
| GB | 22-15081 | * 9/1989 | 385/100 |

OTHER PUBLICATIONS

Patent Abstract of Japan, vol. 9, No. 203 (P –381), Apr. 16, 1985, & JP A 60 066 211.*
Patent Abstracts of Japan, vol. 11, No. 298 (P 620), Apr. 25, 1987, & JP A 62 090 604.*
Stevenson, A. et al., "Fiber–optic coupler fabrication at AOFR", *International Journal of Optoelectronics*, vol. 6, Nos. 1/2, pp. 127–144 (Jan.–Apr. 1991).

* cited by examiner

*Primary Examiner*—Akm E. Ullah
(74) *Attorney, Agent, or Firm*—Merchant & Gould P.C.

(57) ABSTRACT

A fiber optic component package comprising one or more fiber optic components and an inner housing supporting the components. The components have one or more optical fibers associated therewith which extend from the housing. The fiber optic component package also has a layer that is substantially impervious to moisture including water vapor and which encloses the inner housing. The layer includes a sheet of substantially moisture impervious flexible material wrapped around the inner housing and a substantially moisture pervious sealant adhesive that serves to bond the sheet of flexible material and fills at least those regions at edges of the sheet of flexible material.

46 Claims, 3 Drawing Sheets

PACKAGING FIBER OPTIC COMPONENTS

Matter enclosed in heavy brackets [ ] appears in the original patent but forms no part of this reissue specification; matter printed in italics indicates the additions made by reissue.

*This application is a Re-issue of Ser. No. 08/193,187 filed on Jun. 3, 1994 now U.S. Pat. No. 5,602,952.*

FIELD OF THE INVENTION

This invention relates to the packaging of fibre optic components. The invention is described herein with particular reference to the packaging of optical fibre couplers but it will be readily appreciated that the principles of the invention are readily applicable to the packaging of any fibre optic component.

BACKGROUND ART

Optical fibre couplers are presently supplied in a package which is designed both to physically, protect the component and to prevent the ingress of moisture and other contaminants to the component. In one known assembly, the coupler is disposed in an inner cylindrical housing formed of two half silica tubes which are machined to tight dimensional tolerances. These half tubes are brought together and attached together with adhesive. The resultant capsule includes respective adhesive deposits which serve to anchor the optical fibre component to the inner surface of the capsule and to seal the ends through which the fibres extend. Additional adhesive may be applied to the ends of the capsule to stabilise the fibres over a wide temperature range. The capsule is placed within a stainless steel outer casing which is in turn filled with an elastomer compound. The stainless steel outer casing is provided to give additional strength and protection to the optical component assembly.

Optical fibre couplers are required to have lifetimes approaching 40 years and to withstand extensive environmental variations. Even though the silica capsule is sealed with adhesive, it has been found through intensive simulated environmental testing that these adhesives are not consistently impervious to moisture over extended periods of time. Test samples have been detected where moisture has ingressed the capsule and affected coupler performance.

It is not possible to provide a hermetic glass-metal seal with the outer metal casing because of a mismatch of thermal expansion coefficients between most metals and silica

DISCLOSURE OF THE INVENTION

It is accordingly an object of the invention to provide an arrangement for packaging optical fibre components which provides improved sealing against moisture ingress relative to presently known arrangements but which does not unacceptably increase manufacturing costs.

In one aspect, the invention provides a fibre optic component package comprising:

a fibre optic component package comprising:

one or more fibre optic components;

an inner housing supporting the component(s), one or more optical fibres associated with the component(s) extending from the housing; and a layer which is substantially impervious to moisture including water vapour and which encloses said inner housing, said layer including a sheet of substantially moisture impervious flexible material wrapped about the housing and a substantially moisture impervious sealant adhesive which serves to bond said sheet of flexible material and fills at least those regions at edges of said sheet of flexible material.

The invention further provides, in another aspect, a method of packaging a fibre optic component comprising:

supporting the component in an inner housing, with one or more optical fibres associated with the component extending from the housing; and enclosing said housing in a layer which is substantially impervious to moisture including water vapour, said layer including a sheet of substantially moisture impervious flexible material wrapped about the housing, and a substantially moisture impervious sealant adhesive which serves to bond said sheet of flexible material and fills at least those regions at edges of said sheet of flexible material.

The sheet is preferably a metal foil of any suitably compliant metal, for example tin, nickel, gold, aluminium, monel or an appropriate alloy. The foil is advantageously of a thickness in the range 0.01 to 50 micron. The foil is preferably wrapped about the inner housing so as to be overlapped longitudinally of the housing.

In a practical embodiment, the inner housing may be of generally tubular form, e.g. a capsule formed from two half robes of silica or other appropriate material.

Adhesive means is preferably provided to maintain the housing and optical fibres as an assembly. Where the inner housing is a robe, this adhesive means preferably includes adhesive. deposits to seal the ends of the tube.

The package may further comprise an outer casing, e.g. a tubular casing, of material such as stainless steel, selected to provide physical protection for the package. The assembly of the inner housing and the surrounding moisture impervious layer may be retained in the casing in a suitable Sing such as silicone elastomer.

The sealant adhesive is preferably an epoxy compound.

BRIEF DESCRIPTION OF THE DRAWINGS

The invention will now be further described, by way of example only, with reference to the accompanying drawings, in which.

EXEMPLARY EMBODIMENTS

Figure 1:
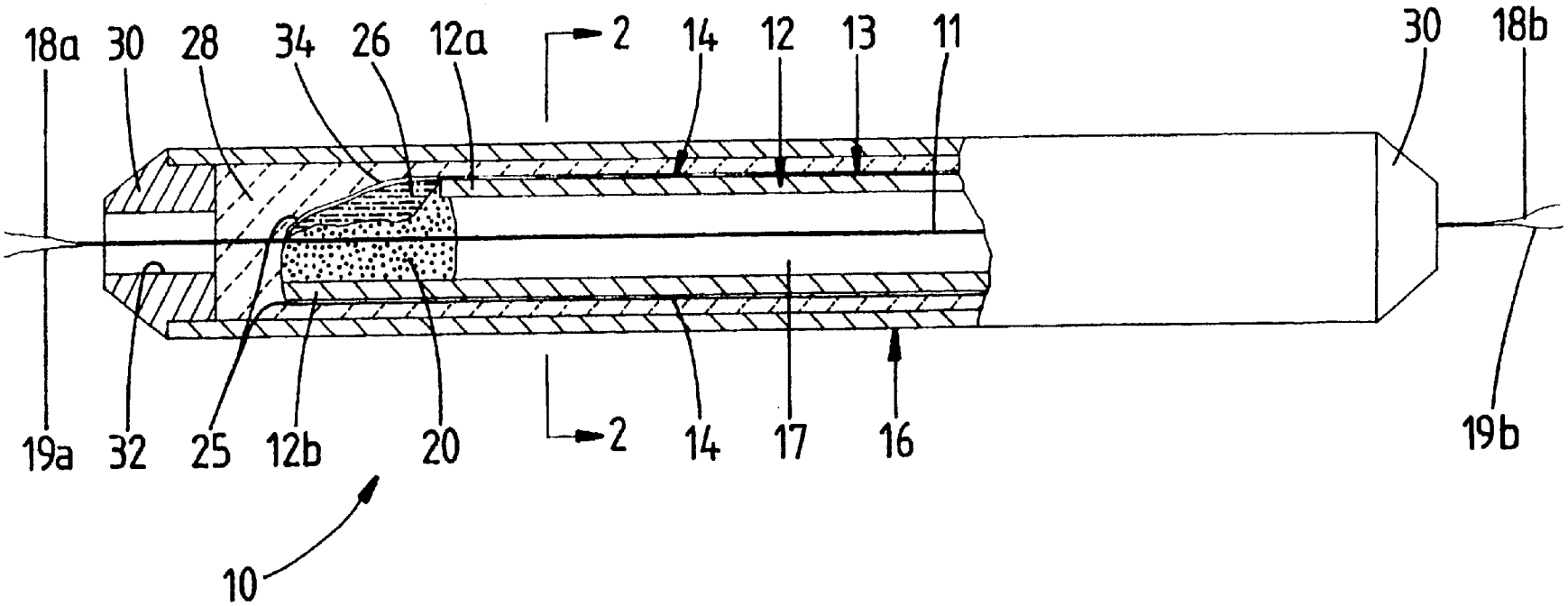
FIG. 1 is a side elevation, partially axially sectioned, of a fibre optic component package according to an embodiment of the invention.

The illustrated fibre optic component package 10 includes the component itself 11, an inner housing 12 for supporting the component comprising an elongate tubular capsule of silica, a substantially moisture impervious layer 13 including a metal foil wrap 14 providing a sheet of flexible material about housing 12, and an outer casing 16. Component 11 may be a fused biconical taper fibre optic coupler and respective pairs of optical fibres 18a, 19a and 18b, 19b then extend from the ends of package 10.

Inner housing or capsule 12 is formed of two half tubes 12a, 12b of silica glass which are butted at their longitudinal edges and glued along these edges to form a tubular enclosure 17 for the coupler. Silica half tube 12b is slightly longer than half tube 12a and respective deposits of adhesive 20 at the ends of half tube 12b locate fibres 18, 19, and therefore coupler 11, centrally of the capsule. Adhesive deposits 20 also seal the ends of the capsule and provide additional adhesion between the two halves. Capsule 12 is typically formed in a final step on the coupler production machine: the two half tubes, with adhesive along their edges, are brought together about a new coupler and the adhesive deposits 20 applied while the fibres 18, 19 are positioned under tension by adjustable clamp devices. The adhesive is cured before the coupler is removed for further processing.

Figure 2:
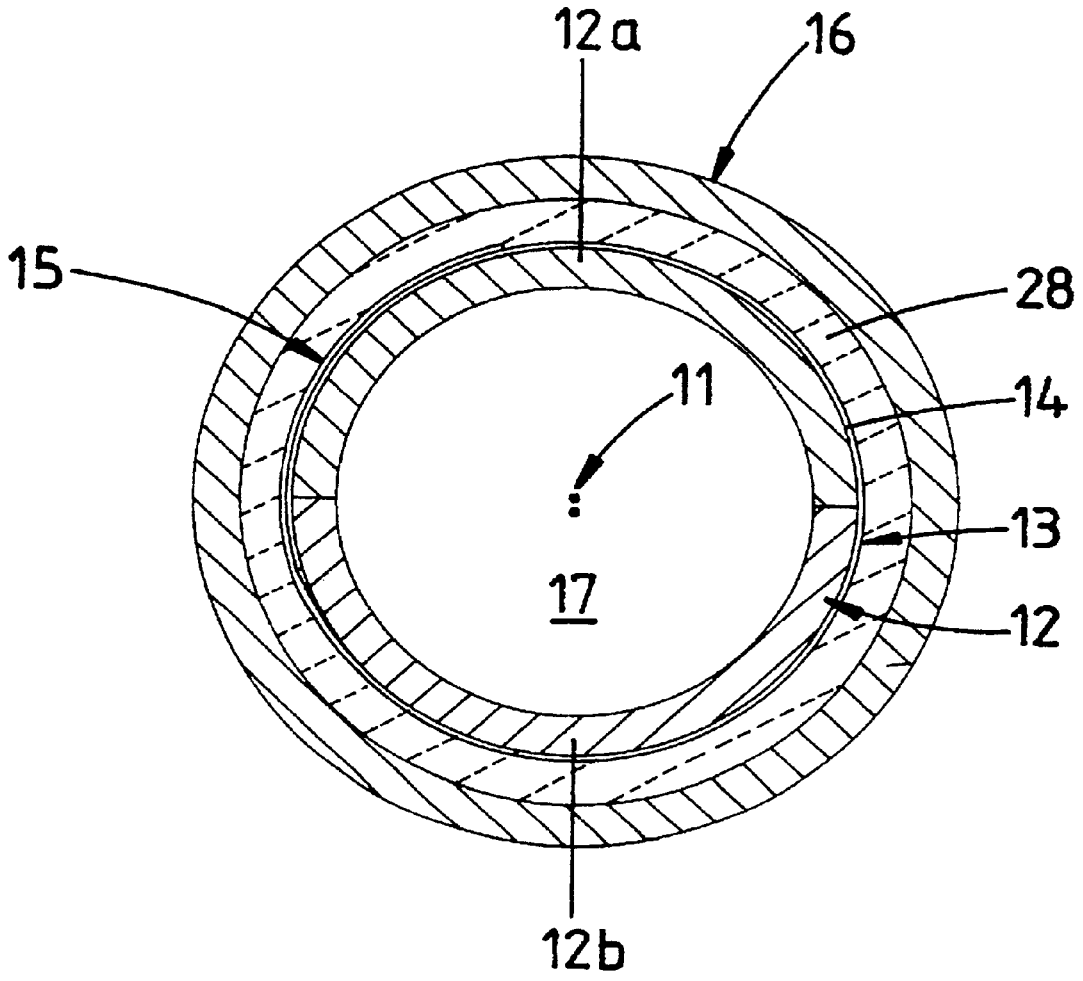
FIG. 2 is a cross-section on the line 2—2 in FIG. 1.

Foil wrap 14 is substantially moisture impervious and is typically of thickness about 10 to 30 micron, for example 25 micron, and preferably in the range 0.01 to 50 micron. The foil may be formed of any suitably compliant metal, for example tin, nickel, gold, aluminium, monel or an appropriate alloy. The foil is circumferentially overlapped at 15 (FIG. 2). The overlapped portion is sealed by a suitable sealant such as epoxy which may also serve to bond the foil to the inner housing 12. Moisture ingress at the ends of the tubular wrap, defined by edge 25, is resisted by the disposition of sealant epoxy in the region 26. The epoxy compound preferably bonds to the foil 14, housing 12 and adhesive deposits 20.

The package 10 is completed by a filling 28 of a low shear strength silicone elastomer within sleeve 16, according to known practice, and by suitable end caps 30 defining ports 32 for the fibres.

It will be appreciated that the metal selected for foil 14 should not have a galvanic action with the material of sleeve 16 as, over extended periods of time, water may then penetrate the sleeve. Sleeve 16 may be stainless steel or other suitable material. If sleeve 16 is stainless steel, a suitable material for the foil 14 is tin.

Figure 3:
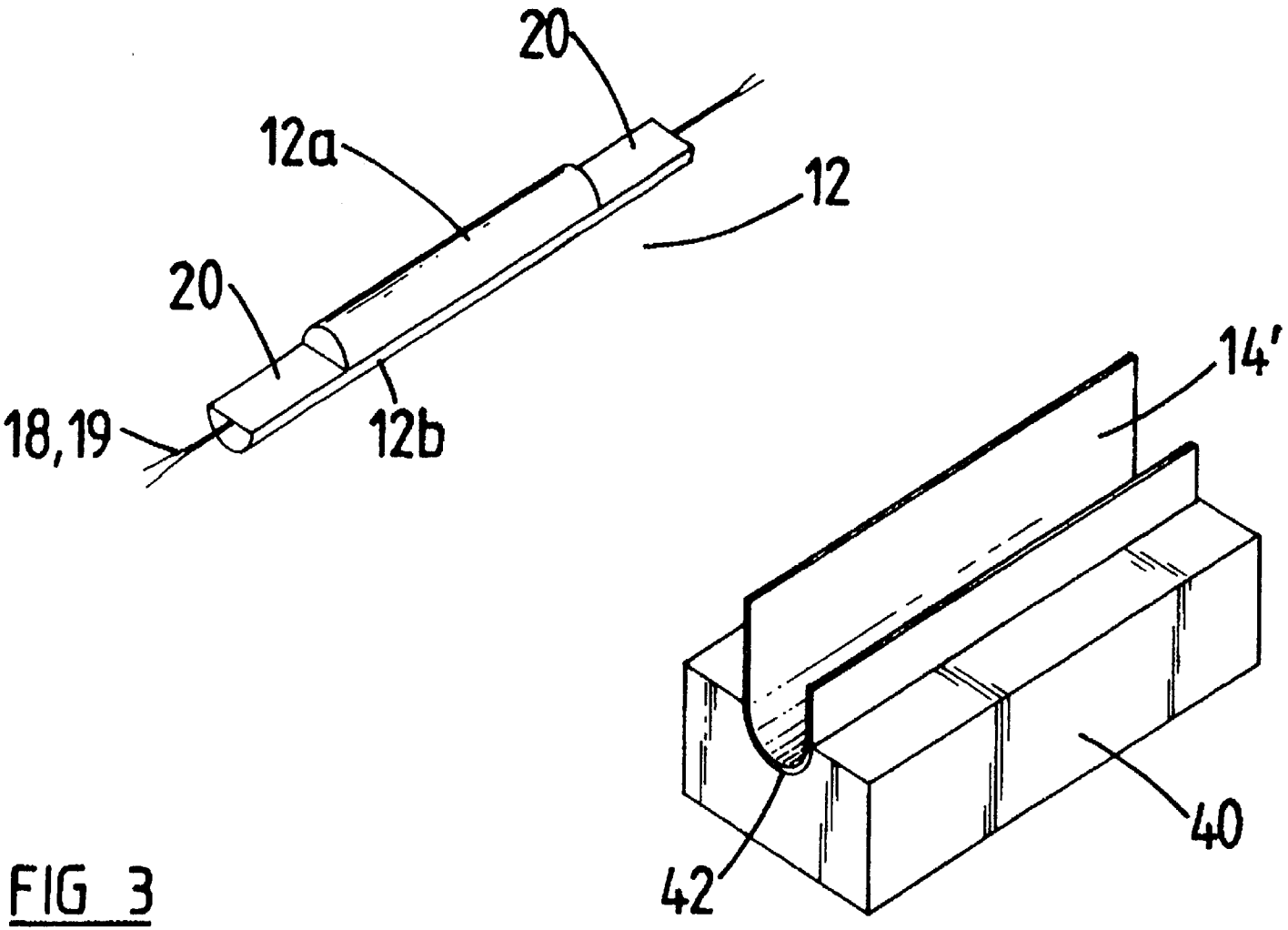
FIG. 3 is a very schematic representation of an arrangenemt by which the package of FIG. 1 might be formed in accordance with the invention.

The manner in which inner capsule 12 is formed has already been described. According to one method of completing the illustrated package, the capsule 12 might be transported from the coupler production machine and first painted along its exterior cylindrical surfaces with the selected epoxy compound. With reference to the diagram of FIG. 3, the painted capsule might then be placed in foil 14' folded into a U-section in a groove 42 of a wrapping form 40, with one side of the foil projecting slightly higher than the other. Two moving wedges (not shown) would then wrap first the short side and then the long side of the foil onto the painted capsule to complete wrap 14. Excess epoxy compound would be squeezed into the overlap region at the completion of the wrap. Excess epoxy compound would also be squeezed from the ends of the wrap during this two-step motion by pressing down the ends 34 of the wrap, thus forming and retaining end fillings 26. Alternatively, end fillings 26 might be provided by applying additional epoxy compound to each end of the wrap either before or after completion of folding.

In an alternative arrangement, the selected epoxy compound may be applied to the inner surface of the foil before wrapping.

The preferred arrangement is that at least a portion of the sealant adhesive is wrapped by the foil and that the sealant adhesive serves to bond the foil 14 and to provide a barrier against moisture ingress to the fibre optic component 11. Preferably the epoxy, compound fills at least those regions at edges of the foil, for example, at the respective axial ends of the wrap and at the region 15 (FIG. 2) where the longitudinal edges overlap. Preferably, the epoxy compound substantially fills the enclosed volume between the foil wrap and housing 12, ie forms a thin layer between the foil wrap and housing 12.

On the completion of wrapping, the package would be removed from the form and placed in an oven for thermal curing of the epoxy, compound.

After curing, the wrapped capsule is placed in stainless steel sleeve 16, which is then filled with silicone elastomer in the known manner, and provided with end caps 30.

It is believed that the illustrated package arrangement provides a significant improvement in sealing of the inner silica capsule 12 without unacceptably adding to the manufacturing cost of the package, and without significantly increasing its weight. This is achieved without risking problems with thermal coefficient mis-matches: thermal expansion will not be a problem as the metal foil is a very thin metal layer and will be constrained by the much larger mass of the silica capsule. The arrangement provides full epoxy/metal protection around the sealed capsule and allows the metal foil to be added to the silica capsule in a wrapping action which avoids the retention of air bubbles, which would not be the case if a metal tube was brought about the capsule. Furthermore, in use of the coupler, water vapour will need to penetrate reasonable lengths of epoxy material 26 before even reaching the innermost housing 12 which in itself is sealed. The metal foil wrap 14, and its manner of application, is such that any small holes in the adhesive at the longitudinal butt joins between the half tubes 12a, 12b will be sealed up by the foil and by the added epoxy compound. The present applicant has found that, in the long term, such small holes can be the source of moisture breaches.

It will be understood that, in alternative embodiments of the invention, the inner housing 12 might not wholly encircle the fibre optic component(s). For example, it is known to provide an inner housing for supporting the component in the form of a half tube.

We claim:

1. A fibre optic component package comprising:

one or more fibre optic components;

an inner housing supporting said fibre optic component(s), one or more optical fibres associated with the component(s) extending from said inner housing; and an enclosure for said inner housing from which said optical fibre(s) extend, said enclosure comprising:

(i) a layer which is substantially impervious to moisture including water vapour and which encloses said inner housing, said layer including a sheet of substantially moisture impervious flexible material wrapped about the housing; and (ii) a moisture impervious sealant adhesive which serves to bond said sheet of said flexible material and fills at least those regions at edges of said sheet of flexible material.

2. A fibre optic component package according to claim 1, wherein said sheet of flexible material is a metal foil of any suitably compliant metal.

3. A fibre optic component package according to claim 2, wherein said foil is of a thickness in the range 0.01 to 50 micron.

4. A fibre optic component package according to claim 1, 2 or 3, wherein said inner housing is generally elongate and said sheet is wrapped about the inner homing so as to be overlapped longitudinally of the housing.

5. A fibre optic component package according to claim 1, wherein said sheet of flexible material encloses a volume about said inner housing, and said sealant adhesive substantially fills this enclosed volume.

6. A fibre optic component package according to claim 1, wherein said sealant adhesive is an epoxy compound.

7. A fibre optic component package according to claim 1 wherein said inner housing is of generally tubular form.

8. A fibre optic component package according to claim 7, wherein said inner housing comprises a capsule formed from two half tubes.

9. A fibre optic component package according to claim 1 further comprising adhesive means maintaining the housing and optical fibres as an assembly, said layer also extending about such adhesive means.

10. A fibre optic component package according to claims 7 or 9, wherein said adhesive means includes adhesive deposits to seal the ends of the tube.

11. A fibre optic component package according to claim 1 further comprising an outer casing to provide physical protection for the package.

12. A fibre optic component package according to claim 9, wherein the assembly of the inner housing and the surrounding layer is retained in said casing in a suitable filling.

13. A method of packaging a fibre optic component comprising:

supporting the component in an inner housing, with one or more optical fibres associated with the component extending from the housing; and enclosing said housing in a layer which is substantially impervious to moisture including water vapour, said layer including a sheet of substantially moisture impervious flexible material wrapped about the housing, and a substantially moisture impervious sealant adhesive which serves to bond said sheet of flexible material and fills at least those regions at edges of said sheet of flexible material.

14. A method according to claim 13, wherein said applying step comprises applying said sealant adhesive to the exterior of the inner housing or to the sheet of substantially moisture impervious flexible material, and wrapping the inner housing including at least a portion of the applied sealant adhesive in said sheet of flexible material.

15. A method according to claim 13 or 14, wherein said sheet of flexible material is a metal foil of any suitably compliant metal.

16. A method according to claims 15, wherein said foil is of a thickness in the range 0.01 to 50 micron.

17. A method according to any one of claims 16, wherein said sheet of flexible material is wrapped about the inner housing so as to be overlapped longitudinally of the housing.

18. A method according to any of claims 14 or 16, wherein adhesive is utilised to maintain the housing and optical fibres as an assembly.

19. A method according to any one of claims 17, 14 or 16, further comprising enclosing the wrapped inner housing in an outer casing for providing physical protection for the package.

20. A method according to claim 19 including retaining the assembly of the inner housing and the surrounding layer in said casing in a suitable filling.

*21. A fiber optic component package comprising:*

*one or more fiber optic components;*

*an inner housing supporting said fiber optic component(s) and having first and second opposing ends; one or more optical fibers associated with the component(s) extending from the inner housing; and*

*a substantially moisture impervious enclosure for the inner housing from which said optical fiber(s) extend, said enclosure comprising,*

*a substantially moisture impervious layer disposed around the inner housing, and*

*a substantially moisture impervious sealant bonded to the substantially moisture impervious layer and enclosing the first and second opposing ends of the inner housing.*

*22. The fiber optic component package of claim 21, wherein at least one of the fiber optic components is an optical fiber coupler.*

*23. The fiber optic component package of claim 21, wherein the substantially moisture impervious layer forms a tubular shape around the inner housing.*

*24. The fiber optic component package of claim 21, wherein the substantially moisture impervious layer comprises a sheet of substantially moisture impervious material wrapped about the inner housing.*

*25. The fiber optic component package of claim 21, wherein the substantially moisture impervious layer extends at least from the first opposing end of the inner housing to the second opposing end of the inner housing.*

*26. The fiber optic component package of claim 21, wherein at least a portion of the substantially moisture impervious sealant bonds the substantially moisture impervious layer to the inner housing.*

*27. The fiber optic component package of claim 21, wherein the substantially moisture impervious layer comprises a metal layer.*

*28. The fiber optic component package of claim 27, wherein the substantially moisture impervious layer comprises at least one of tin, nickel, gold, aluminum, and alloys comprising at least one of tin, nickel, gold, and aluminum.*

*29. The fiber optic component package of claim 21, wherein the inner housing comprises a capsule formed from two half tubes.*

*30. The fiber optic component package of claim 29, wherein the fiber optic component is disposed in a one of the half tubes.*

*31. The fiber optic component package of claim 21, further comprising an outer casing disposed around the substantially moisture impervious enclosure.*

*32. An optical fiber coupler package comprising:*

*an optical fiber coupler;*

*an inner housing for holding the optical fiber coupler, the inner housing having first and second opposing ends and at least one optical fiber extending out of a one of the first and second opposing ends;*

*a substantially moisture impervious enclosure for the inner housing comprising,*

*a substantially moisture impervious layer disposed around the inner housing, and*

*a substantially moisture impervious sealant bonded to the substantially moisture impervious layer and enclosing the first and second opposing ends of the inner housing.*

*33. The optical fiber coupler package of claim 32, wherein the inner housing comprises a first half tube in which the optical fiber coupler is disposed and a second half tube coupled to the first half tube to form a tubular inner housing.*

*34. The optical fiber coupler package of claim 32, wherein the inner housing further comprises at least two optical fibers coupled to the optical fiber coupler with at least one of the optical fibers extending from the first opposing end of the inner housing and at least one of the optical fibers extending from the second opposing end of the inner housing.*

*35. The optical fiber coupler package of claim 34, further comprising adhesive disposed at ends of the first and second half tubes to hold the at least two optical fibers.*

*36. A fiber optic component package comprising:*

*one or more fiber optic components;*

*an inner housing supporting said fiber optic component(s), one or more optical fibers associated with the component(s) extending from said inner housing; and*

*an enclosure for said inner housing from which said optical fiber(s) extend, said enclosure comprising:*

*(i) a layer which is substantially impervious to moisture including water vapor and which encloses said inner housing; and*

*(ii) a moisture impervious sealant which fills at least those regions at edges of said layer.*

*37. The fiber optic component package of claim 36, wherein at least one of the fiber optic components is an optical fiber coupler.*

*38. The fiber optic component package of claim 36, wherein the layer comprises a sheet of substantially moisture impervious material wrapped about the inner housing.*

*39. The fiber optic component package of claim 36, wherein the layer forms a tubular shape around the inner housing.*

*40. The fiber optic component package of claim 36, wherein the sealant comprises a moisture impervious sealant adhesive which serves to bond the layer to the inner housing and fills at least those regions at edges of the layer.*

*41. The fiber optic component package of claim 36, wherein the layer comprises a metal layer.*

*42. The fiber optic component package of claim 36, further comprising an outer casing disposed around the substantially moisture impervious enclosure.*

*43. An optical fiber coupler package comprising:*

*one or more optical fiber couplers;*

*an inner housing supporting said optical fiber coupler(s), one or more optical fibers associated with the optical fiber coupler(s) extending from said inner housing; and*

*an enclosure for said inner housing from which said optical fiber(s) extend, said enclosure comprising:*

*(i) a layer which is substantially impervious to moisture including water vapor and which encloses said inner housing; and*

*(ii) a moisture impervious sealant which fills at least those regions at edges of said layer.*

*44. The optical fiber coupler package of claim 43, wherein the layer forms a tubular shape around the inner housing.*

*45. The optical fiber coupler package of claim 43, wherein the sealant comprises a moisture impervious sealant adhesive which serves to bond the layer to the inner housing and fills at least those regions at edges of the layer.*

*46. A method of packaging a fiber optic component comprising:*

*supporting the component in an inner housing, with one or more optical fibers associated with the component extending from the housing; and*

*enclosing said housing in (i) a layer which is substantially impervious to moisture including water vapor and (ii) a substantially moisture impervious sealant which fills at least those regions at edges of said layer.*

* * * * *